United States Patent
Cosyns et al.

(10) Patent No.: US 9,074,144 B2
(45) Date of Patent: Jul. 7, 2015

(54) PROCESS FOR HYDROGENATION OF BENZENE

(75) Inventors: Jean Cosyns, Maule (FR); Quentin Debuisschert, Rueil Malmaison (FR); Jean-Luc Nocca, Houston, TX (US); Delphine Largeteau, Houston, TX (US)

(73) Assignee: IFP ENERGIES NOUVELLES, Rueil-Malmaison Cedex (FR)

( * ) Notice: Subject to any disclaimer, the term of this patent is extended or adjusted under 35 U.S.C. 154(b) by 1284 days.

(21) Appl. No.: 12/244,208

(22) Filed: Oct. 2, 2008

(65) Prior Publication Data
US 2010/0016645 A1    Jan. 21, 2010

(30) Foreign Application Priority Data

Jul. 18, 2008 (FR) ..................... 08 04102

(51) Int. Cl.
| C10G 45/48 | (2006.01) |
| C01B 3/26 | (2006.01) |
| C01B 3/50 | (2006.01) |
| C10G 7/02 | (2006.01) |
| C10G 35/04 | (2006.01) |

(52) U.S. Cl.
CPC . C10G 45/48 (2013.01); C01B 3/26 (2013.01); C01B 3/50 (2013.01); C01B 2203/0277 (2013.01); C01B 2203/047 (2013.01); C10G 7/02 (2013.01); C10G 35/04 (2013.01); C10G 2300/1096 (2013.01); C10G 2300/4006 (2013.01); C10G 2400/02 (2013.01); C10G 2400/04 (2013.01)

(58) Field of Classification Search
USPC ......... 585/258, 250, 254, 256, 266, 269, 270; 208/142, 143, 144, 145
See application file for complete search history.

(56) References Cited

U.S. PATENT DOCUMENTS

| 2,866,693 A * | 12/1958 | Allen ............................. 585/14 |
| 2,898,387 A * | 8/1959 | Teter ............................ 585/256 |

(Continued)

OTHER PUBLICATIONS

Speight, "Refinery Processes, Survey" in Kirk-Othmer Encyclopedia of Chemical Technology, 4th ed., John Wiley & Sons, Mar. 27, 1996.*

(Continued)

*Primary Examiner* — In Suk Bullock
*Assistant Examiner* — Ali Z Fadhel
(74) *Attorney, Agent, or Firm* — Millen, White, Zelano & Branigan, P.C.

(57) ABSTRACT

This invention relates to a process for hydrogenation of benzene contained in a catalytic reformate, in which:
- The hydrogen that is present in the catalytic reformate is separated from the remainder of the reformate with separation means,
- A light benzene-enriched fraction is separated from the heavy reformate,
- The light reformate that contains the benzene is brought into contact with a nickel-based hydrogenation catalyst at a temperature of between 90° C. and 150° C., a VVH of between 0.5 and 10, and with at least one portion of hydrogen that is obtained during the separation stage of the hydrogen at the top of the separator tank and used at the output pressure of said separator.

11 Claims, 2 Drawing Sheets

(56) References Cited

U.S. PATENT DOCUMENTS

Figure 1:
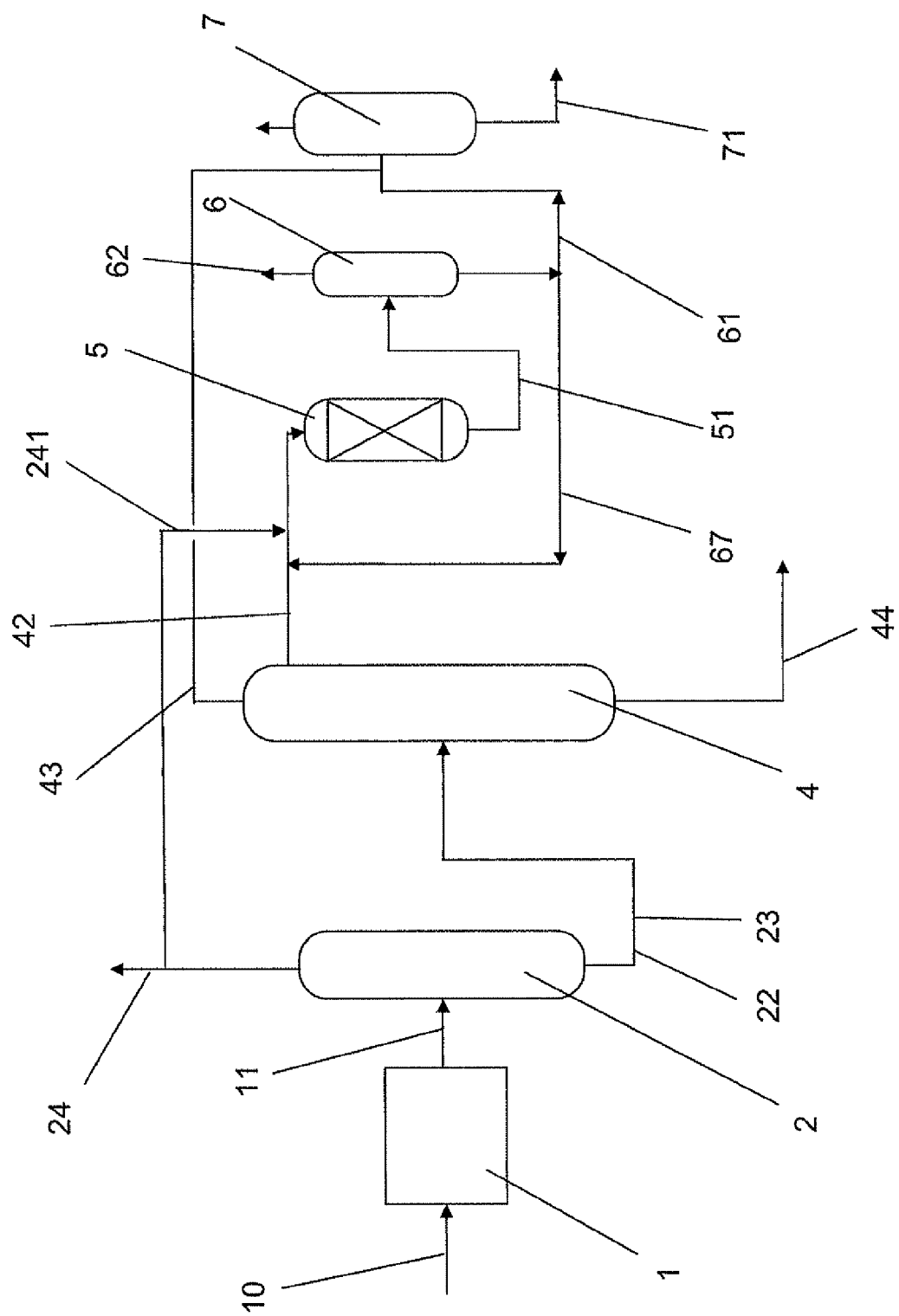

| | | | |
|---|---|---|---|
| 3,328,476 A * | 6/1967 | Cabbage | 585/256 |
| 3,644,196 A * | 2/1972 | Lawson | 208/62 |
| 3,647,634 A * | 3/1972 | Bajek et al. | 196/132 |
| 5,252,197 A * | 10/1993 | Alexander et al. | 208/134 |
| 5,723,026 A * | 3/1998 | Leisse et al. | 203/58 |
| 5,830,345 A * | 11/1998 | Lee et al. | 208/92 |
| 5,914,435 A * | 6/1999 | Streicher et al. | 585/819 |
| 6,048,450 A * | 4/2000 | Mikitenko et al. | 208/143 |
| 6,261,442 B1 * | 7/2001 | Ambrosino et al. | 208/92 |
| 2010/0016645 A1 * | 1/2010 | Cosyns et al. | 585/258 |

OTHER PUBLICATIONS

Seador, et al., "Distillation" in Perry's Chemical Engineer's Handbook, 7th ed., McGraw-Hill, 1997, available on-line Mar. 1, 2001.*
Lide, CRC Handbook of Chemistry and Physics, 91st ed., 2011 Internet Version, D. R. Lide, editor—month unknown.*

* cited by examiner

PROCESS FOR HYDROGENATION OF BENZENE

This invention relates to the field of the hydrogenation of benzene and more particularly a process, and the associated device, for hydrogenation of benzene in a catalytic reformate.

The benzene is a carcinogenic compound whose content in the gasolines is regulated and reduced to increasingly lower levels in a large number of countries.

During the catalytic reforming, the reformate that is obtained contains between 0.5 and 15% benzene, and on average between 2 and 8% benzene. One solution for eliminating this benzene consists in hydrogenating it. It is therefore desirable that the refineries that use catalytic reforming units be equipped with benzene hydrogenation units.

Currently, the conventional scheme for hydrogenation of benzene consists in treating a benzene-enriched fraction in a hydrogenation unit. For this purpose, the reformate that is obtained from a medium-pressure separator tank that is arranged at the outlet of the catalytic reforming unit is sent into a stabilization column for eliminating the $C_4$ fractions, then to a reformate splitter. The so-called light benzene-rich reformate $C_5$-$C_6$ fraction that is obtained from the reformate splitter is then sent to a reactor that contains a nickel- or platinum-based catalyst.

The procedure is performed at pressures of more than 20 bar, which often requires compressing the hydrogen that is obtained from the medium-pressure separator of the upstream catalytic reforming unit.

With this device, the inlet operating temperatures in the hydrogenation reactor are most generally more than 130° C. if it is desired to hydrogenate the benzene so as to obtain the required specification, i.e., less than 0.2% by volume in the light reformate and in general 0.5% by volume in the total reformate that is obtained by mixing heavy reformate that is obtained at the bottom of the reformate splitter and the light reformate that is obtained from the hydrogenation unit.

One of the drawbacks of this process scheme is that it requires a large investment and heavy use of utilities because it requires the use of a hydrogen makeup compressor to increase the operating pressure of the reactor as well as the implantation of three distillation columns, i.e., two stabilization columns (downstream from the catalytic reforming and downstream from the hydrogenation) and a reformate splitter.

Another drawback comes from the operating conditions, since it is necessary with this type of device to work at high temperatures and pressures.

This invention therefore has as its object to overcome one or more drawbacks of the prior art by proposing a process, and the associated device, for hydrogenation of benzene whose operating conditions do not require the use of more than two distillation columns.

For this purpose, this invention proposes a process for hydrogenation of benzene that is contained in a catalytic reformate, in which:

The hydrogen that is present in the catalytic reformate is separated from the remainder of the reformate with separation means,
A light benzene-enriched fraction is separated from the heavy reformate,
The light reformate that contains the benzene is brought into contact with a nickel-based hydrogenation catalyst at a temperature of between 90° C. and 150° C., a VVH of between 0.5 and 10, and with at least one portion of hydrogen that is obtained during the separation stage of the hydrogen at the top of the separator tank and used at the output pressure of said separator.

The catalyst that is used in the process according to the invention comprises between 10 and 60% by weight of nickel. The catalyst has an active surface whose dispersion is at least 10%.

In the process according to the invention, contact with the catalyst is carried out at a pressure of between 5 and 25 bar.

In the process according to the invention, the contact with the catalyst is carried out at a temperature that is between 95° C. and 140° C.

In the process according to the invention, the contact with the catalyst is carried out with the VVH between 1 and 4.

According to an embodiment of the invention, the light reformate is obtained by lateral draw-off from the reformate splitter.

According to an embodiment of the invention, the $C_4$ and $C_5$ fractions are drawn off at the top of the reformate splitter.

According to an embodiment of the invention, the $C_4$ and $C_5$ fractions are sent to a stabilization column.

In another embodiment of the invention, the light reformate is obtained by draw-off at the top of the reformate splitter.

In the process according to the invention, a portion of the hydrogenated product, obtained at the end of the contact stage between the light reformate that contains benzene and a hydrogenation catalyst, is sent to a stabilization column.

According to an embodiment of the invention, the hydrogenated product is sent into a gas-liquid separator before being sent into the stabilization column.

According to an embodiment of the invention, the stabilization column can be fed by any unstabilized hydrocarbon fraction that is obtained from the catalytic reforming.

According to an embodiment of the invention, three fractions are obtained at the outlet of the stabilization column:

A $C_{4-}$ fraction that is sent to a diesel fuel network,
A light fraction with high vapor pressure that is sent to a petrochemical site,
A heavier fraction that is sent to the gasoline pool or to an isomerization unit.

According to an embodiment of the invention, the stabilization column that is used is an existing stabilization column of the upstream catalytic reforming unit.

Figure 2:
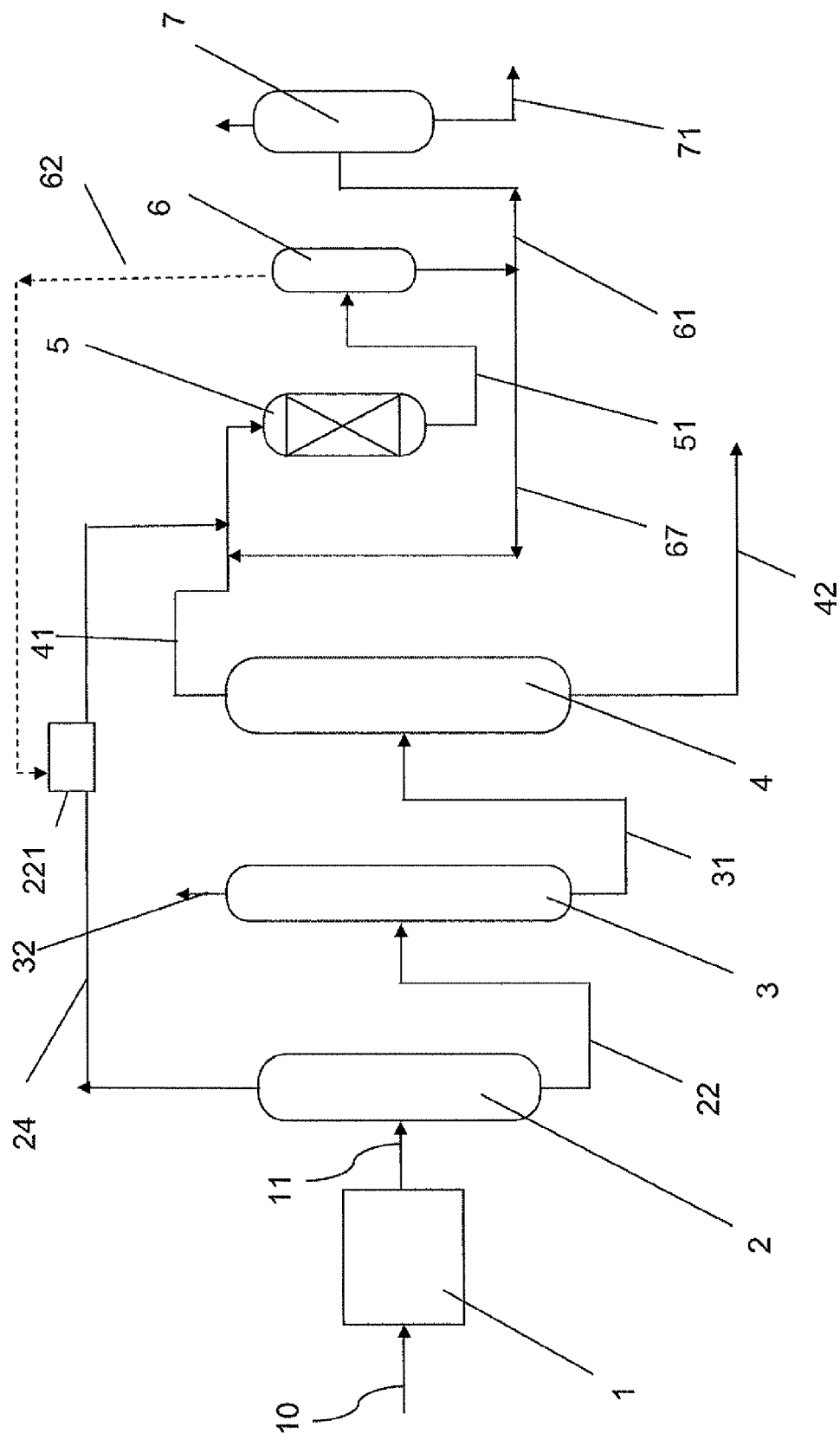

Other characteristics and advantages of the invention will be better understood and will become clearer from reading the description given below by referring to the attached figures and data by way of example:

FIG. 1 shows a variant of the hydrogenation scheme of the benzene according to the invention, FIG. 2 shows the standard hydrogenation scheme of the benzene according to the prior art.

During the catalytic reforming, the naphthenic molecules of the feedstock that is to be treated (10) are transformed into aromatic molecules. The thus obtained feedstock in this way has a higher octane number. This feedstock that is obtained after catalytic reforming is also called a reformate. It is this reformate that will be treated so as to hydrogenate the benzene that it contains.

In the processes for hydrogenation of benzene, illustrated in FIGS. 1 and 2, the effluent of the reaction section of the catalytic reforming (1) is sent (11) into a separation tank (2) that is also called a separator. This separator (2) operates at medium pressure, i.e., between 5 and 20 bar, and preferably between 0 and 20 bar, and it makes it possible to separate the hydrogen (24) from the remainder of the reformate (23). This hydrogen (24) is used to supply downstream units that consume hydrogen and in particular can be used in the hydrogenation reactor (5).

In the process according to the invention that is illustrated in FIG. 1, the reformate, formed by a heavy fraction and a light fraction, obtained from the separator (2), is then sent directly (23) into a reformate splitter (4) that is a distillation column that makes it possible to separate the heavy fraction (44) that contains the toluene from the light fraction (42, 43). Unlike the hydrogenation process according to the prior art that uses a stabilization column (3), illustrated in FIG. 2, the reformate is not stabilized before being sent (23) into the splitter. In the process according to the prior art, only the $C_{4-}$ fractions (containing less than 10%, preferably less than 5%, and very preferably less than 1% of the $C_{5+}$ fractions that are obtained from the reaction section) are eliminated at this stabilization column (3), and the reformate that is obtained from the bottom of this column contains less than 10%, preferably less than 5%, and very preferably less than 1% of $C_{4-}$. Thus, the light reformate (41), which is then sent into the reactor, typically comprises less than 10%, preferably less than 7.5%, and very preferably less than 5% of $C_{4-}$, and more than 90%, preferably more than 95%, of $C_5$, and more than 50%, preferably more than 80%, and very preferably more than 90%, of benzene obtained from the catalytic reforming.

The light reformate that is obtained after distillation in the splitter (4) can be collected either in lateral draw-off (42) or at the top of the column (not illustrated in the figure).

In the case where the reformate is obtained in lateral draw-off (42), it is formed by a $C_6$- and benzene-enriched fraction. The light reformate that is obtained after distillation in the splitter (4) and that contains the major portion of benzene has a fraction point that is adjusted so as to reduce the toluene concentration. This fraction point is generally between 20 and 100° C., and preferably between 30 and 80° C.

In the case where the reformate is obtained at the top of the column, it is formed by a $C_4$-$C_5$-$C_{6\text{-}benzene}$ fraction.

This light reformate that contains the benzene, obtained at the top or by lateral draw-off, is then sent (42) to a hydrogenation reactor (5). It is in this reactor (5) that the reaction for hydrogenation of the benzene that is contained in the light reformate takes place. This reaction takes place in the presence of all or part of the hydrogen that is obtained (241) from the separator (2) that is arranged after the catalytic reforming unit (1). One of the characteristics of the invention is obtained from the fact that this hydrogen is injected without recompression, unlike the device of the prior art that requires a recompression (221) of hydrogen. The hydrogen is used without recompression because the reactor that is used within the scope of the invention works at a pressure that is less than or equal to that of the separator tank (2). The fact of not recompressing the hydrogen is an advantage in terms of equipment and therefore a gain in terms of investment.

The operating pressure of the benzene hydrogenation unit is generally low enough and is between 5 and 25 bar (1 bar=0.1 Mpa). Preferably, this pressure is between 10 and 20 bar, and very preferably, it is between 12 and 18 bar. The temperature at the inlet of the reactor is between 90 and 150° C.; preferably this temperature is between 95 and 140° C.; and very preferably, it is between 100 and 120° C. Under these conditions, the light reformate is essentially in the liquid phase. The liquid volumetric flow rate (volumetric flow rate per hour divided by the volume of catalyst or VVH) is between 0.5 and 10 and preferably between 1 and 4.

The hydrogenated product that is obtained at the outlet of the reactor (5) is then sent (51) after cooling into a gas-liquid separator (6). A portion of the liquid is recycled (67) in the reactor (5) so as to control the increase in temperature; the other portion is sent (61) to a stabilization column (7) that can be an existing stabilization column of the reforming unit. The light reformate is obtained at the bottom (71) of this stabilization column. At the top of the column, excess hydrogen from the reaction is obtained in the reactor and the $C_{4-}$ fractions that are obtained from the hydrogen of the reaction. In the case of the process according to the invention, there are also the $C_{4-}$ fractions that are obtained from the reinjected reformate at the top of the column.

The excess hydrogen (62) that is obtained from the gas-liquid separator tank (6) can be sent (62) to a compressor that usually compresses the hydrogen that is obtained from the separator tank (2) that is arranged after the catalytic reforming unit.

The low-pressure benzene hydrogenation operation involves partial pressures of low bases of between 1 and 2 bar. For this purpose, so as to maximize the partial pressure (above 0.5 bar), it is therefore preferable to reduce the concentration of light compounds in the gas phase of the reactor to reduce the light compounds of the light reformate ($C_5$) by sampling the feedstock of the hydrogenation in lateral draw-off from the reformate splitter (4).

When the feedstock that is sent into the hydrogenation unit is obtained from a lateral draw-off from the reformate splitter, the light fraction that is drawn off at the top of the reformate splitter and that contains the $C_5$ and $C_4$ fractions of the reformate is remixed with the hydrogenation product to be stabilized in the stabilization column (7) or can be sent to a unit for isomerization of paraffins.

Although the catalysts that are commonly used in the industrial processes for hydrogenation of benzene are based both on platinum and nickel, it has been observed, surprisingly enough, that only the nickel-based catalysts exhibited adequate performance levels within the scope of the process according to the invention.

The nickel catalysts of the reactor that are used in the process according to the invention can contain sufficiently high contents of metal, i.e., between 10 and 60% by weight and preferably at least 20% by weight. They are prepared by, for example, impregnation of a soluble nickel salt on an appropriate substrate or else by co-mixing with a mineral gel or by any other suitable technique that is known to one skilled in the art.

The catalyst is generally pre-reduced and passivated by techniques known to one skilled in the art.

After reduction, the catalyst should have an adequately large active surface area that is characterized in particular by a dispersion (% of superficial nickel relative to the total % of nickel) of at least 10% and preferably more than 20%.

The device can also comprise a mixed Pd/passivated alumina system (according to the patent filed with the INPI on Apr. 25, 2008 under number 08/02-345) arranged upstream from the hydrogenation unit or the reformate splitter (4). This system makes it possible to protect the hydrogenation catalyst from chlorinated compounds coming from the catalytic reforming (HCl or organic chlorides) and to prevent the formation of salts at the top of the reformate splitter (ammonium chlorides).

When the existing reforming unit is already equipped at the outlet of an additional stabilization column, this column will be located downstream from the hydrogenation unit.

This column, whose dimensions are larger than those of a column that is conventionally used in the hydrogenation units, optionally can produce three fractions, a light $C_{4-}$ fraction sent to the fuel gas network, a fraction with high vapor pressure sent to a petrochemical site (enhanced in particular in terms of petrochemical naphtha), and a heavy fraction that is sent to the gasoline pool or to an isomerization unit.

The following comparative examples illustrate this invention.

EXAMPLE 1

Hydrogenation of Benzene with a Nickel-Based Catalyst By Using the Process According to the Prior Art The device that is used in this example is the one that is described in FIG. 2. At the outlet of the reforming unit (1), this device comprises a separation column (2) into which the reformate (11) that is obtained from reforming is treated so as to separate it from hydrogen (24). This reformate (22) then passes into a stabilization column (3) that allows the elimination of $C_4$ fractions (32) then (31) in a splitter (4). At the outlet of the splitter (4), the reformate is separated into a heavy reformate (42) and a light reformate (41) that will undergo a hydrogenation stage in the hydrogenation unit.

The treated light reformate has the following composition:

| Hydrocarbons | % by Weight |
| --- | --- |
| $C_4$ | 3.7 |
| $C_5$ | 28.0 |
| $C_6$ | 32.6 |
| Benzene | 15.0 |
| $C_7$ | 20.7 |
| Total | 100.0 |

The hydrogen that is used is delivered at a pressure of 30 bar after recompression in the medium-pressure separator tank for catalytic reforming and with the following composition:

| | % by Weight |
| --- | --- |
| $H_1$ | 90.0 |
| $C_1$ | 5.6 |
| $C_2$ | 3.2 |
| $C_3$ | 0.9 |
| $C_4$ | 0.3 |
| Chlorine (ppm) | 4.0 |

A nickel-based catalyst that contains 25% by weight of nickel, having a metallic dispersion of 30% and a surface area of 170 m2, is used.

The catalyst is loaded into a fixed-bed reactor. It is first pretreated with hydrogen under the following conditions:
Pressure: 5 bar
Temperature: 150° C.
Hourly volumetric flow rate per volume of 100 Nm3/m3 CATA catalyst;
Duration: 6 hours
The chlorine is eliminated by, for example, absorption in the system that is described in the patent filed on Apr. 25, 2008 with the INPI under the number 08/02-345.
The light reformate is injected under the following conditions:
LHSV: Hourly volumetric flow rate per volume of catalyst: 1.5
Reactor inlet temperature: 150° C.
Pressure: 28 bar
The hydrogen that is described above is injected at a flow rate of a quite large stoichiometric excess relative to the benzene to be hydrogenated so as to obtain a partial hydrogen pressure at the outlet of the reactor that is equal to at least 3 bar effective.

To limit the increase in temperature in the reactor below 60° C., the hydrogenated product is recycled in the reactor at a rate of about 4.

EXAMPLE 2

Hydrogenation of Benzene with a Nickel-Based Catalyst by Using the Process According to the Invention The device that is used in this example is the one that is described in FIG. 1.

The treated light reformate has the same composition as the one in Example 1.

The hydrogen that is used comes from the medium-pressure separator tank. It is delivered at a pressure of 18 bar/g and with the same composition as the one of Example 1.

The catalyst of Example 1, which has undergone the same treatment, is used.

The chlorine is eliminated in the same way as in Example 1.

The light reformate is injected under the following conditions:

Pressure: 16 bar
LHSV: Hourly volumetric flow rate per volume of catalyst: 1.5
Reactor inlet temperature: 120° C.
The hydrogen that is described above is injected in a light stoichiometric excess relative to the benzene to be hydrogenated so as to obtain a partial pressure of H2 at the outlet of the reactor that is equal to at least 1 bar effective.

To limit the increase in temperature in the reactor below a value of 60° C., the hydrogenated product in the reactor is recycled at a rate of about 4.

EXAMPLE 3

Comparison of Performance Levels Obtained with the Nickel-Based Catalyst for the Process According to the Prior Art and the Process According to the Invention The performance levels obtained in Examples 1 and 2 are summarized in the table below:

| | Example 1 | Example 2 |
| --- | --- | --- |
| Process for Hydrogenation of Benzene | According to the Prior Art | According to the Invention |
| Catalyst | Ni | Ni |
| Delta T Observed (° C.) | 25 | 25 |
| Benzene in the Final Product (% by Volume) | 0.01 | 0.1 |

It is noted that in the two cases, the conversion of benzene is almost total (>99%). Thus, the process according to the invention—more economical in terms of investment (lower pressure of the reaction section, a single stabilization column for the catalytic reforming, and the hydrogenation of benzene) and simpler to implement (no recompression of the hydrogen)—makes it possible to obtain an almost complete hydrogenation of benzene.

EXAMPLE 4

Hydrogenation of Benzene with a Platinum-Based Catalyst by Using the Process According to the Invention In this example, the reactor is loaded with a platinum-based catalyst. It contains 0.3% by weight of platinum that is deposited on alumina having a specific surface area of 200 m$^2$/g. The dispersion of the platinum is 100%.

The liquid and gaseous feedstocks as well as the operating conditions are the same as those of Example 2.

EXAMPLE 5

Comparison of the Performance Levels Obtained with the Nickel-Based Catalyst and the Platinum-Based Catalyst for the Process According to the Invention The performance levels that are obtained in Examples 2 and 4 are summarized in the table below:

|  | Example 2 | Example 4 |
| --- | --- | --- |
| Catalyst | Ni | Pt |
| Delta T Observed (° C.) | 25 | 14 |
| Benzene in the Final Product (% by Volume) | 0.1 | 1.8 |

It is noted that only the catalyst with nickel makes it possible to achieve an almost complete hydrogenation of benzene under the conditions of the scheme of the invention.

The use of the scheme according to the invention as well as the recommended catalyst shows that it is possible to eliminate one distillation column, i.e., two columns (splitter and one stabilizer) instead of three in the standard scheme (splitter and 2 stabilizers). The hydrogen that is used as makeup to the unit is not compressed before entering the reactor.

It should be obvious to one skilled in the art that this invention should not be limited to the details provided above and allows embodiments under many other specific forms without moving away from the field of application of the invention. Consequently, these embodiments should be considered by way of illustration and can be modified without, however, exceeding the scope defined by the attached claims.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing and in the examples, all temperatures are set forth uncorrected in degrees Celsius, and all parts and percentages are by weight, unless otherwise indicated.

The entire disclosures of all applications, patents and publications, cited herein and of corresponding French application No. 08/04,102, filed Jul. 18, 2008, are incorporated by reference herein.

The preceding examples can be repeated with similar success by substituting the generically or specifically described reactants and/or operating conditions of this invention for those used in the preceding example.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A process for hydrogenation of benzene contained in a catalytic reformate comprising the steps of:
separating, in a separator tank, hydrogen present in the catalytic reformate from the remainder of the reformate, said separating being conducted at a medium pressure ranging from 10 to 20 bar,
separating resultant hydrogen-depleted reformate into a benzene-enriched light reformate fraction and a heavy reformate fraction,
hydrogenating the benzene-enriched light reformate fraction through contact with a nickel-based hydrogenation catalyst comprising 10-60% by weight of nickel, having an active surface whose dispersion is at least 10% at a pressure ranging from 10 to 20 bar, at a temperature of between 90° C. and 150° C., a VVH of between 0.5 and 10, and with at least one portion of hydrogen obtained from said separator tank at said pressure of 10 to 20 bar without recompression of said hydrogen, so as to provide a hydrogenated product stream.

2. A process for hydrogenation of benzene according to claim 1, in which the temperature is between 95° C. and 140° C.

3. A process for hydrogenation of benzene according to claim 1, in which the VVH is between 1 and 4.

4. A process for hydrogenation of benzene according to claim 1, in which the light reformate fraction is obtained by lateral draw-off from a reformate splitter (4).

5. A process for hydrogenation of benzene according to claim 4, in which C4 and C5 fractions are drawn off from the top of said reformate splitter and sent to a stabilization column (7).

6. A process for hydrogenation of benzene according to claim 1, in which the light reformate fraction is obtained by draw-off at the top of a reformate splitter (4).

7. A process for hydrogenation of benzene according to claim 1, in which a portion of resultant hydrogenated product, obtained at the end of the contact stage between the light reformate fraction that contains benzene and a hydrogenation catalyst, is sent to a stabilization column (7).

8. A process for hydrogenation of benzene according to claim 7, in which resultant hydrogenated product is sent into a gas-liquid separator (6) before being sent into the stabilization column (7).

9. A process for hydrogenation of benzene according to claim 8, in which the stabilization column is supplied by any unstabilized hydrocarbon fraction obtained from an upstream catalytic reforming.

10. A process for hydrogenation of benzene according to claim 9, in which three fractions are obtained at outlets of the stabilization column, namely:
a C4− fraction that is sent to a diesel fuel network;
a light fraction having a high vapor pressure that is sent to a petrochemical site, and
a fraction heavier than the light fraction that is sent to a gasoline pool or to an isomerization unit.

11. A process for hydrogenation of benzene according to claim 10, in which the stabilization column is an existing stabilization column incorporated in an upstream catalytic reforming unit.

* * * * *